United States Patent [19]

Deacutis et al.

[11] Patent Number: 5,261,747
[45] Date of Patent: Nov. 16, 1993

[54] SWITCHABLE THERMOELECTRIC ELEMENT AND ARRAY

[75] Inventors: James J. Deacutis, Hanover, N.H.; Albert K. Henning, Norwich, Vt.

[73] Assignee: Trustees of Dartmouth College, Hanover, N.H.

[21] Appl. No.: 903,012

[22] Filed: Jun. 22, 1992

[51] Int. Cl.5 .......................... G01K 7/04; G01K 3/00
[52] U.S. Cl. ...................... 374/137; 374/166; 374/179; 374/182; 136/229; 136/235; 136/201
[58] Field of Search ............ 374/110, 137, 166, 179, 374/180, 152, 182; 136/235, 229, 221, 201

[56] References Cited

U.S. PATENT DOCUMENTS

| | | | |
|---|---|---|---|
| 2,015,838 | 10/1935 | Borden et al. | 374/166 |
| 2,136,055 | 11/1938 | Miller | 136/229 |
| 2,509,048 | 5/1950 | Vogelsang | 374/110 |
| 3,347,098 | 10/1967 | Bielstein et al. | 374/137 |
| 3,434,349 | 3/1969 | Frischman | 374/179 |
| 3,596,518 | 8/1971 | Kirkpatrick | 374/166 |
| 4,130,019 | 12/1978 | Nitschke | 374/110 |

FOREIGN PATENT DOCUMENTS

| | | | |
|---|---|---|---|
| 0047693 | 4/1979 | Japan | 136/235 |
| 0024655 | 2/1980 | Japan | 374/166 |
| 0452922 | 5/1968 | Switzerland | 374/166 |
| 0586344 | 12/1977 | U.S.S.R. | 374/166 |
| 0800692 | 1/1981 | U.S.S.R. | 136/221 |
| 0980451 | 1/1965 | United Kingdom | 374/110 |

Primary Examiner—William A. Cuchlinski, Jr.
Assistant Examiner—Diego F. F. Gutierrez
Attorney, Agent, or Firm—Reed Smith Shaw & McClay

[57] ABSTRACT

A thermoelectric array, such as a thermocouple array, includes a pair of dissimilar conductors disposed adjacent to each other at a plurality of locations. A switch is provided which selectively electrically couples and decouples the conductors at each such location, and an effective thermoelectric element is formed at the location where a switch is closed. The switches may be easily controlled to ensure that only the switch at the desired location is closed to form an effective thermoelectric element. Switches may include MOSFET pairs in series or dual-gate MOSFETs, and arrays of such switched thermoelectric elements may be integrated and fabricated on a common semiconductor substrate.

28 Claims, 4 Drawing Sheets

SWITCHABLE THERMOELECTRIC ELEMENT AND ARRAY

FIELD OF THE INVENTION

This invention relates to measurement of physical properties by a plurality of sensors, such as by a plurality of thermocouples used in thermoelectric thermometry. This invention also relates to an element which may be used in an array of thermocouples for measurement of temperature at multiple locations. Still more particularly, this invention relates to a thermocouple array topology and switching method for temperature measurement in a two-dimensional or three-dimensional region. This invention also relates to other thermoelectric elements and arrays such as Peltier arrays.

BACKGROUND OF THE INVENTION

Thermocouples have long been used as temperature measuring devices. A thermocouple consists of a pair of conductors made of different materials which are joined together and contact each other at each end and otherwise insulated from one another along their lengths. Each junction thus formed produces a thermal emf or thermal voltage between the dissimilar conductors which is a function of its temperature. Such a thermocouple may be used as an electronic sensor to monitor temperature by cutting one of the conductors and inserting a voltage measuring device between the cut ends. The voltage which appears at the cut ends and is therefore measured by the voltmeter is a function of the difference in temperature between the two thermocouple junctions. By maintaining one of the junctions (the reference junction) at a known reference temperature, the other junction (the measuring junction) will function as a probe which monitors its local temperature with respect to the reference temperature.

It is often desirable to make temperature measurements at a number of different points in a region of space. A one-dimensional array of thermocouple measuring junctions can be built by contacting, at intervals along a length of one conductor made of a first material (e.g. Metal "A") a series of separate junction branches, each composed of another conductor made of a dissimilar material (e.g. Metal "B"). To measure the temperature at a selected junction, the Metal "B" branch of the selected junction can be switched to the voltmeter. However, in doing so care must be taken to avoid having more than one thermocouple junction active in the circuit at any time. If two or more thermocouple branches are electrically connected in parallel, each will interfere with the others' voltage output, resulting in a gross loss of localized thermometric accuracy.

For this reason, it has been impossible to extend the technique of such a simple linear array into a two-dimensional simple grid mesh of thermocouple junctions. Until now, the only solution to building a two-dimensional array of thermocouple elements was to create a two-dimensional branched or meander linear array. Design and construction of such an array, even of modest size, can be physically and electrically cumbersome. For an array of M rows by N columns of elements, M x N junction branches need to be laid out and separately addressed. For instance, for a 10×10 array, 100 branches are required to be separately addressed.

SUMMARY OF THE INVENTION

It is therefore an object of the invention to provide an improved method and apparatus for temperature sensing at a plurality of points. In accordance with the invention, a switched thermocouple element is provided at a location by providing a pair of dissimilar conductors adjacent but not in contact with each other at the location and providing a switch at the location to electrically couple the conductors and provide an effective thermocouple at the location. Further in accordance with the invention, an array of such thermocouples is provided. Each switch in the array may be separately actuated by a simple network of electrically orthogonal address lines. The invention thus provides reliability at least as good as prior art linear array topologies without their associated addressing problems. This permits practical arrays to be fabricated with very large numbers of thermocouples. The preferred switching elements are field effect transistor switches. An integrated circuit temperature sensing array may be fabricated by integrating an array of such switches and associated thermocouples on a semiconducting substrate.

Other objects and features of the invention will be understood with reference to the following description and claims and the drawings.

DETAILED DESCRIPTION

In the drawings and in the following description, a first conductor type used as a thermocouple component will be illustrated by a thin line and referred to as "Metal A". The second conductor type comprising the thermocouple will be illustrated by a thick line and referred to as "Metal B". Corresponding elements in each Figure are designated by the same reference numerals.

Figure 1:
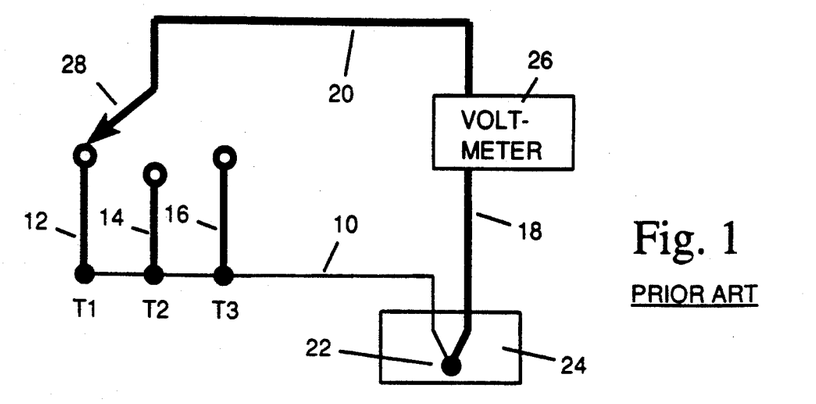
FIG. 1 is a schematic illustration of a prior art linear array of thermocouple elements.

FIG. 1 is a schematic illustration of a linear array of thermocouple elements, such as is found in the prior art. As shown, the array includes three measuring thermocouple junctions T1, T2, and T3. Each of these junctions is formed by contacting a length 10 of Metal A with a branch (12, 14, and 16, respectively) of Metal B. A reference junction 22 is formed by contacting the Metal A conductor 10, at one end thereof, with a length 18 of Metal B. The temperature of any one of the junctions T1, T2, or T3 with respect to the reference temperature may be measured by coupling its connected Metal B branch 12, 14, or 16 to conductor 20, also made of Metal B, via switch 28. Switch 28 connects any selected one of the Metal B branch conductors to the common Metal B bus or trunk line 20. The free ends of Metal B conductors 18 and 20, i.e. their ends which are not connected to reference junction 22 or to switch 28, are connected to the inputs of voltmeter 26. Voltmeter 26 is preferably a device having a high input impedance so as to not unduly load the thermoelectric sources provided by each junction, which would introduce inaccuracies into the thermoelectric measurement. Reference junction 22 is maintained at a known reference temperature by disposing it within an environment 24 which is maintained at the reference temperature. Thus the voltage which is produced by the thermocouple array and measurable at voltmeter 26 is a unique function of the difference in temperature between the reference junction 22 and the selected measuring junction T1, T2, or T3. It will be understood that voltmeter 26 may be embodied in a wide variety of devices which produce an output which is responsive to their input voltage. Such devices may for instance produce visual or electrical outputs, which may be in voltage units, temperature units, or other units.

Figure 2:
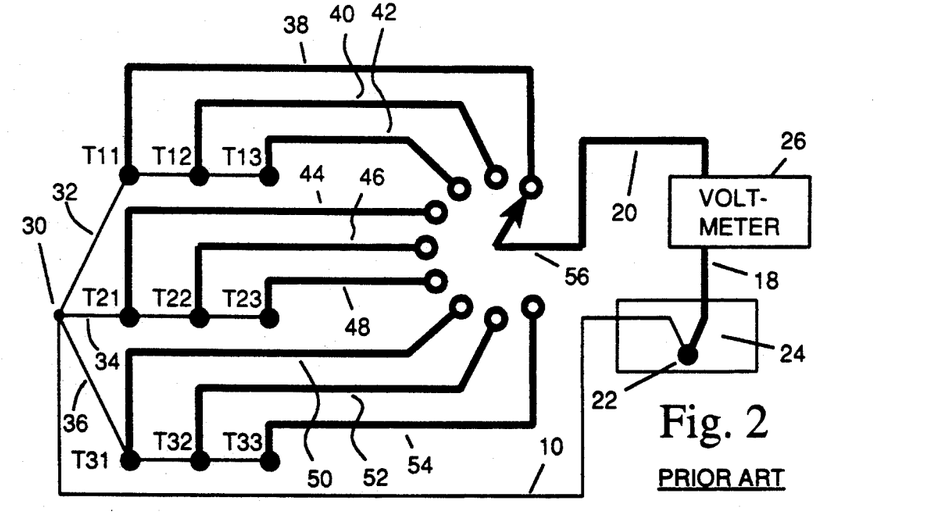
FIG. 2 is a schematic illustration of a prior art branched linear array of thermocouple junctions.

FIG. 2 is a schematic illustration of a prior art method of extending the simple linear array topology of FIG. 1 to a two-dimensional measurement. The array consists of a 3×3 array of thermocouple elements, providing a total of 9 elements. These are identified in FIG. 2 by a double numerical reference indicating their row and column position in the array, i.e. T11, T12, T13, T21, ... T33. The junction array includes three branches 32, 34, and 36 of Metal A which are joined to Metal A trunk conductor 10 at junction point 30. Each Metal A branch has three thermocouple junctions formed along it by contacting the Metal A branches with Metal B branches 38, 40, 42, ... 54. In order to separately address each of the nine thermocouple elements present in the array, a nine position switch 56 must be provided to couple a selected Metal B branch to the Metal B trunk conductor 20. Thus, while a functional array of M×N junctions may be disposed over a two-dimensional area, it is necessary to provide M×N branches of one of the conductors and to separately switch each such branch to the voltage measuring device. This topology and the switching requirements are extremely cumbersome, particularly for large arrays. It should be noted that an equivalent topology may be created by forming a linear array of thermocouples having the desired number of thermocouple elements, and folding the linear array into a meander path so as to cover two dimensions. Like the branched linear array described, this would also require M×N branches of one of the conductor types and separate switching of each of the M×N array elements.

Figure 3:
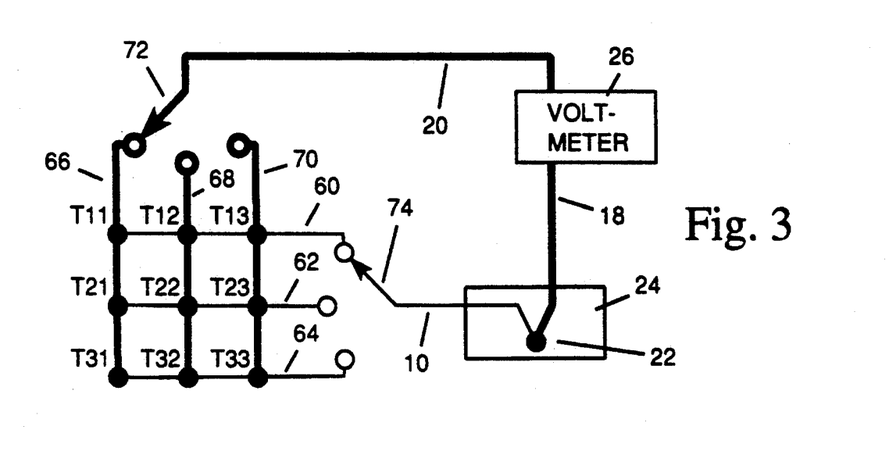
FIG. 3 is a schematic illustration of a simple grid mesh array of prior art thermocouple junctions.

FIG. 3 is an illustration of an attempt to circumvent the switching problems of the linear array by using a row and column addressing technique. The 3×3 array of thermocouple elements T11, T12 ... T33 is formed by contacting three branch conductors 60, 62, and 64 of Metal A to three branch conductors 66, 68, and 70 of Metal B. One of the three Metal A branches is selectively coupled to Metal A trunk conductor 10 by row addressing switch 74, and one of the three Metal B branches is selectively coupled to Metal B trunk conductor 20 by column addressing switch 72. This attempt at two-dimensional row and column addressing is unworkable and therefore useless because the topology employed creates a grid of interconnected parallel junctions, each of which interferes with others and precludes any reliable temperature measurement.

Figure 4:
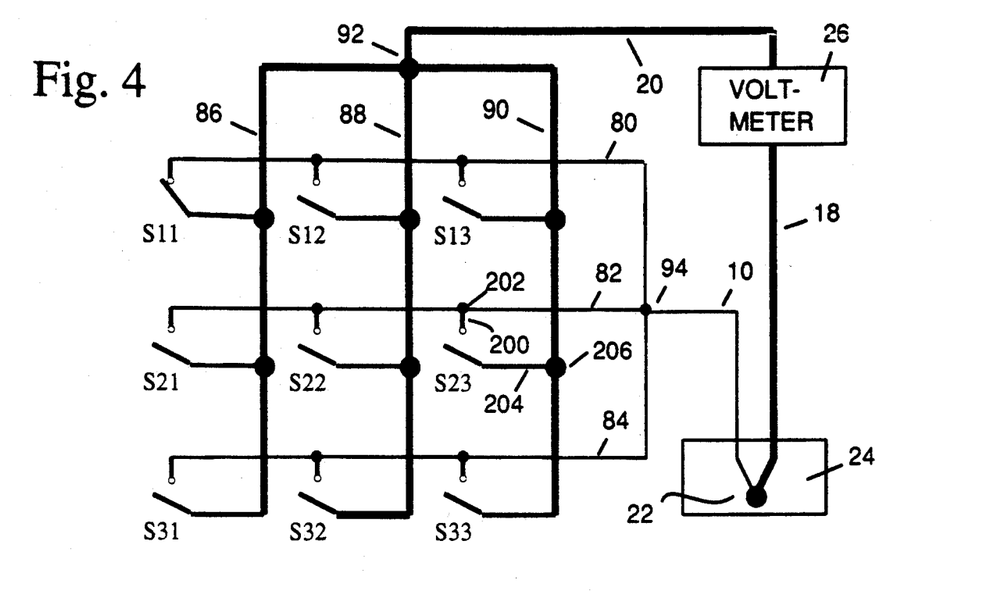
FIG. 4 is schematic illustration of a switched thermocouple array in accordance with the invention.

FIG. 4 is a schematic illustration of an array topology in accordance with the present invention. The array illustrated is a 3×3 array having nine thermocouple measuring junctions. To form the array, three branches 80, 82, and 84 of Metal A are joined to Metal A trunk conductor 10 at connection point 94, and three branches 86, 88, and 90 of Metal B are joined to Metal B trunk conductor 20 at connection point 92. The array contains M×N switches S11, S12 ... S33, one associated with each thermocouple junction to be formed. Each switch is separately addressable, and when addressed it forms a measuring junction which is coupled into the circuit. No junctions are formed except where one of the switches is actuated (S11 as shown). The switch array may be made easily addressable by row and column, thus providing easy addressability while avoiding the problems of the parallel junctions formed in a simple grid mesh of thermocouple metals.

Figure 5:
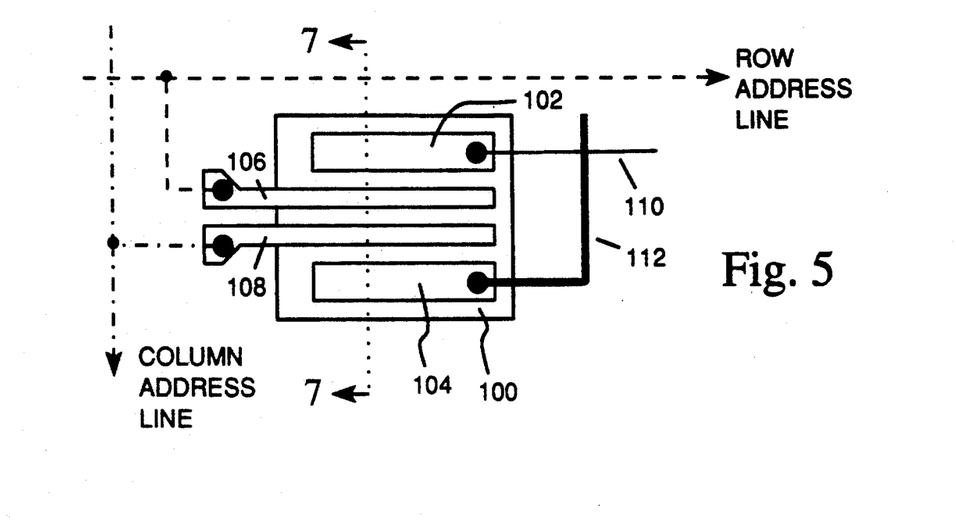
FIG. 5 is a schematic plan view of a dual gate MOSFET which may be used as a switching element in the array of the invention.

FIG. 5 is a schematic plan view of a preferred switching element for use in the array of the present invention. The switching element illustrated is a dual gate MOSFET. The switch includes a semiconducting substrate 100, with a source metallization 102 and a drain metallization 104 disposed on one surface thereof. Interposed along and insulated by insulator 140 (FIG. 7) from the surface of substrate 100 between source electrode 102 and drain electrode 104 are a pair of gate metallizations 106 and 108. A branch 110 of Metal A is connected to source electrode 102, and a branch 112 of Metal B is connected drain electrode 104. This structure defines a metal-oxide-semiconductor field effect transistor in which conduction between the drain and source electrodes is controlled by both of the gate electrodes 106 and 108. Thus, if the device is fabricated as an n-channel enhancement mode device, no conduction channel will be created between the source 102 and drain 104 unless each of the gate electrodes 106 and 108 is above its threshold voltage. Raising both gates above their threshold voltages creates a drain to source conduction channel and forms an effective thermocouple junction between Metal A conductor 110 and Metal B conductor 112. Under all other gate conditions, there is no conduction channel and the switch isolates the Metal A conductor from the Metal B conductor at the switch location.

Figure 6:
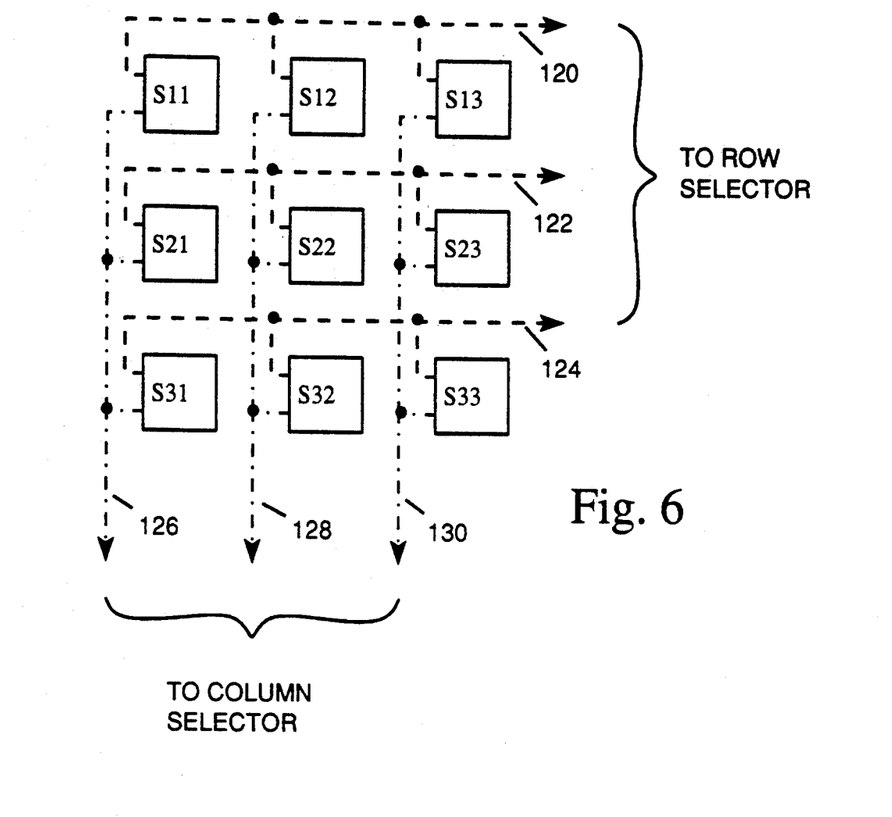
FIG. 6 is a schematic illustration of addressing circuitry in accordance with the invention which may be used to selectively address individual thermocouple elements in an array.

Such a switch enables a very convenient control structure to be implemented for individually selecting thermocouples in the array. Such an array addressing scheme is illustrated in FIG. 6, which is a schematic illustration of the switch control topology. FIG. 6 illustrates the control of the switch array, but does not illustrate the Metal A and Metal B network which would be coupled by such switches to form individual thermocouples; such a network is shown in FIG. 4. In the circuit of FIG. 6, a 3×3 array of switches S11, S12, ... S33 is disposed in a two-dimensional region. Such switches may be of the dual gate MOSFET form shown in FIG. 5. Each switch has one of its control inputs connected to one of the row address lines 120, 122, 124, and the other of its control inputs coupled to one of the column address lines 126, 128, 130. Each of the orthogonal sets of address lines may be connected to a switching device which selects one address line of the three lines in each set. Only the switch element in the array which has both of its address lines selected will be switched on so as to form a thermocouple junction.

Figure 7:
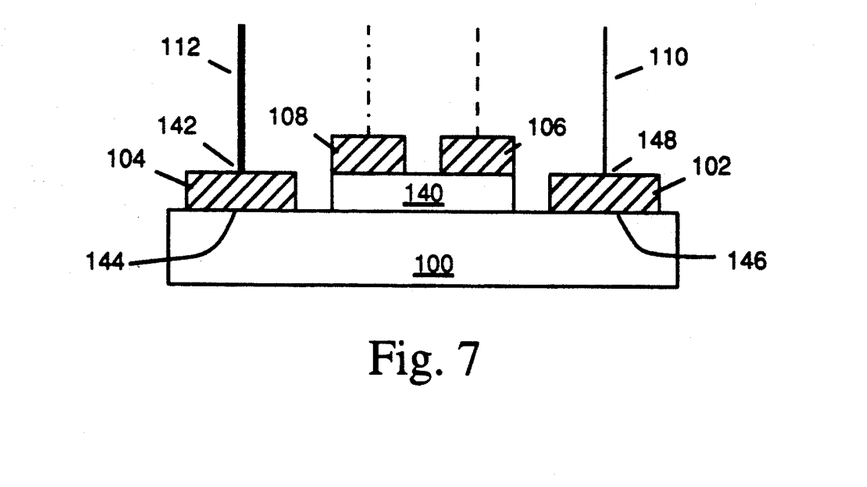
FIG. 7 is a cross-sectional view of the dual gate MOSFET of FIG. 5.

One noteworthy feature of the present invention is the nature of the thermocouple junction formed by the switch, which will be discussed with reference to FIG. 7, a schematic cross-section of the device shown in FIG. 5 taken along the lines 7—7 therein, also showing the address and thermocouple conductors coupled to the switch. It is seen that the switch does not form a junction by contacting the Metal A conductor to the Metal B conductor. Instead, a set of junctions is formed, the members of which are connected in series. As illustrated, proceeding from left to right in FIG. 7, there is a Metal B-electrode metal junction 142; an electrode metal-semiconductor junction 144; a semiconductor-electrode metal junction 146; and an electrode metal-Metal A junction 148. If the switch is isothermal, the net voltage produced between Metal A and Metal B through this series of junctions 142-148 is the voltage which would be produced by a Metal B-Metal A junction at that temperature. Such a switch may in practice be made sufficiently isothermal that reasonably accurate measurements can be made. It should be noted that other junctions may occur in the area of the switched thermocouple, for instance if the source and drain metallizations contain layers of different metals. So long as the switch is substantially isothermal, the presence of any number of such junctions will have negligible effect on the thermoelectric temperature measurement. When actuated, the switch provides an effective Metal A-Metal B thermocouple at the location where the switch couples the Metal A and B branches. The switchable thermocouple element shown in FIGS. 5 and 7 generally includes a first conductor made of a first material, a second conductor made of a second material which differs from the first material, disposed adjacent to but not in contact with the first conductor, and a switch which selectively couples and decouples the first and second conductors.

Isothermal conditions are facilitated by making the switched thermocouple elements as small as possible and eliminating spurious heat sources associated with the switches. FET switches are particularly desirable since they do not introduce any voltage offset into the measurement. They also are easily controlled, can be made physically small, and can be easily integrated in an array.

In prior art systems for temperature measurements where a number of thermocouple junctions are selectively coupled to a common voltmeter circuit for determining thermal voltage and corresponding temperature, special switches and connectors have been used in which the contacting metals are the same as the thermocouple materials, in order to avoid uncontrolled thermoelectric potentials in the measuring circuit. With the system of the present invention using switches disposed at the location of each effective thermocouple to be formed, the presence of other junctions does not give rise to uncontrolled thermoelectric potentials in the measuring circuitry and does not materially affect the measurement. Since the switch addressing circuitry is coupled to the switch gates, thermoelectric potentials in such circuitry do not affect the temperature measurement. Such switch addressing circuitry may be designed without regard to the formation of junctions between dissimilar materials in it.

Although a dual-gate MOSFET is a preferred switching element for use in such a two-dimensional array, and commercial units such as type TA7151 have been made, other switching elements may also be used. For instance, a single gate MOSFET may be used as a switch to form a thermocouple element in a linear array. In a two-dimensional array, each switch may include a single-gate MOSFET and an AND gate, in which the AND gate inputs are connected to the row and column address circuitry and the AND gate output controls the MOSFET gate. Also, a dual-gate MOSFET may be simulated by coupling a pair of single-gate MOSFETs in series, with the drain of one coupled to the source of the other. Other electronic switches such as JFETs may be used.

Figure 8:
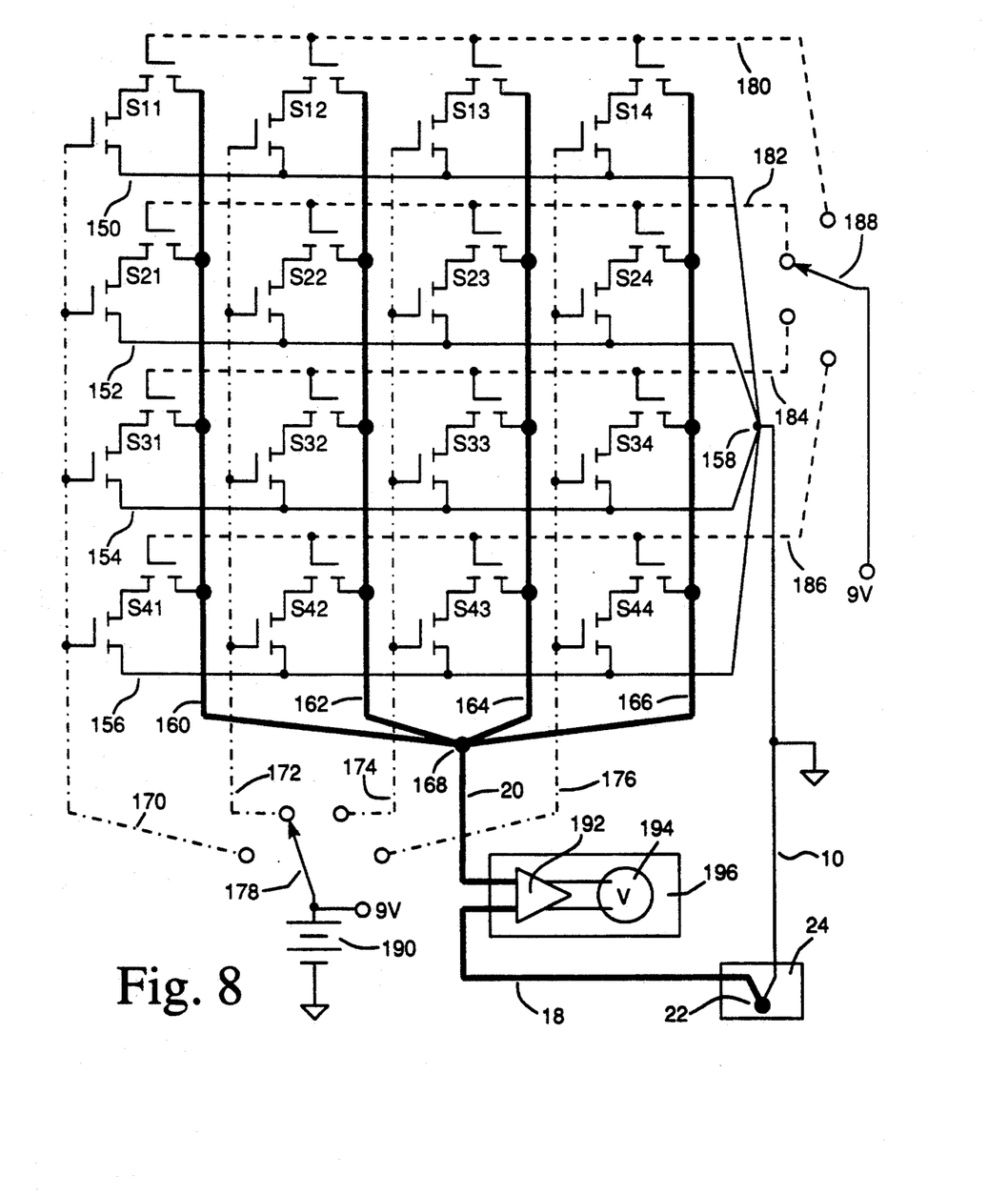
FIG. 8 is a schematic illustration of a 4×4 array of switched thermocouple elements constructed in accordance with a preferred embodiment of the invention.

FIG. 8 is a schematic illustration of a 4×4 array of thermocouples which was fabricated by the inventors, using a pair of Motorola IRFF123 n-channel enhancement mode FETs connected in series to form each switch element. A 4×4 array of such switches S11, S12, . . . S44 was provided. The thermocouples used copper as Metal A and constantan as Metal B. The array includes four branches of each metal type. The source of each switch assembly was connected to one of the four copper branches 150, 152, 154, and 156, which branches were connected together at node 158 and to copper trunk conductor 10. The drain of each switch assembly was connected to one of the four constantan column branches 160, 162, 164, and 166, which branches were connected together at node 168 and to constantan trunk conductor 20. One gate of each switch assembly was connected to one of the column address lines 170, 172, 174, 176, and the other gate of each switch assembly was connected to one of the row address lines 180, 182, 184, 186. Row and column address lines were selected by switches 188 and 178, respectively, which switches applied a 9 volt potential from source 190 to the selected row and column address lines. Only one switch assembly in the array has both its row and column address lines selected; both of the FETs in this switch are biased into conduction by the applied 9 volt gate potentials, and thus form an effective copper-constantan thermocouple at that location. When using insulated gate FET's, it is desirable to provide a means for draining gate charge accumulated during switching; otherwise the transistor may be held on after deselection by the gate change. In their prototype, Applicants grounded the nonselected switch contacts; a bleed resistor may also be used, and may be advantageous in integrated switch arrays.

Applicants have constructed a prototype array in accordance with FIG. 8, in which each of the thermocouple array elements was centered atop a fiberglass "chimney" which permitted localized temperature changes to be made. The dissimilar thermocouple wires of each element were spatially separated from each other by about 2 mm where they contacted the source and drain leads of the FET switch. Each chimney was accessible to a soldering iron tip used as a heated probe to provide heat under a selected one or more of the array elements in order to mimic widely varying temperature distributions across the array. To monitor a particular array element, the row and column addressing switches selected the appropriate row and column address for the specific element to be addressed. Outputs were provided by a thermocouple monitoring assembly 196 including a type T thermocouple amplifier 192 and a voltmeter 194. When heated by the rising air convection from the soldering iron tip held about 1 cm below the switched junction, the reading of that switched junction increased to as high as 150° F. Comparison readings were made by using an ordinary single junction thermocouple probe at various locations near the switched junction. The vertical temperature gradient near the switch junction was found to be as great as 35° F. per mm, by taking calibrated readings from a single junction thermocouple probe placed at various vertical locations. Upon heating with such a heated probe, the switched junction reading at 150° F. was within 5% of the calibrated reading of a single junction thermocouple probe located about 1 mm above the switched thermocouple junction. If no local heat source was present under any of the 16 switched junctions, each junction provided substantially the same temperature measurement (74° F. with a standard deviation of 0.6° F.).

With the above apparatus, it proved possible to select and monitor the output of any of the 16 switched thermocouple elements, without emf interference from any of the other (electrically open) switched thermocouple elements irrespective of their variously changing thermal environments. The switched thermocouple array output was accurate and repeatable. The speed of measurements stabilization for a newly selected switched thermocouple array element was limited by the monitoring circuitry used in the experiment.

A switched thermocouple array in accordance with the invention is capable of being fabricated as a micro device array for the measurement of temperature profiles on a micro-scale. Such an array would be capable of distinguishably measuring temperatures at each of many points separated by distances perhaps as small as 10 microns. For instance, it may be possible to measure temperature at each of one million distinguishable points within an area 1 cm on a side, by a device having a few as five external wire leads. Microtechnology industries increasingly rely on the ability to monitor temperature at multiple points in very small areas for measurement and testing in manufacturing and development of microelectronics and other micro devices, and the invention is expected to be useful in such applications.

The number of separate metal layers needed to create an M×N array integrated microcircuit of switched thermocouple elements is quite manageable, possibly two, regardless of the value of M or N. Electrical interface to such an array would require only two connections to the array of thermoelectric metal couples, and M+N connections between the gate electrodes and the X-Y address driver circuitry if each row and column address line were made externally available. If the address driver circuitry were to be synchronously clocked and/or externally triggered, it could reside alongside the array as part of a monolithic or hybrid circuit. Thus, temperature sensing arrays with virtually unlimited multiplicity of elements may be fabricated with perhaps as few as five terminal leads to supply power and trigger signals and to return outputs.

Such a micro array is expected to be useful to monitor micro-calorimetric activities on a surface or in a volume, e.g. in micro-biology or micro-chemistry. Such an array is expected to be useful as the heart of an infrared imaging system, in which application it may be less complicated and cheaper than existing infrared imaging systems. The array of the invention may find application in laser beam energy profiling, neuroprosthetic temperature sensing implants, power feedback control with respect to Joule heat evolving from segments within electronic systems, and frictional heat buildup studies and feedback control.

The array of the present invention is not restricted to micro applications, and can be fabricated as a macrosystem building block element. Accordingly, an array of such devices can be utilized with industrial reactors or systems to monitor temperature at a multitude of points, for feedback control of temperature dependent processes, and the like. A two-dimensional array can be fabricated on a flexible medium, so that it may be wrapped to envelop all or part of an object or organism in order to monitor and map the temperature of its surface. Such a device may be applicable for instance in the medical field as a tool for metabolism studies.

The principles of the invention may be extended to three physical dimensions by appropriately disposing the thermocouple conductors and providing appropriately controlled switches. For instance, a triple gate FET similar to the structure of FIG. 5 may be provided, or 3 FETs may be coupled in series, or a single FET may be controlled by a 3-input gate. The principles may similarly be extended to higher dimensions by providing 3 or more sets of electrically orthogonal control signals to appropriate switch elements.

While the principles of the invention are particularly suited to arrays of temperature sensing thermocouples, they are also applicable to control of arrays of other devices, such as thermoelectric Peltier devices and photodetectors. In fact, the arrays shown and described herein may be used as Peltier arrays by substituting a current source for the voltage monitoring circuitry. Moreover, a single array may function as a temperature measuring and controlling device by alternately supplying current to a junction to affect its temperature and measuring the thermal voltage of the junction.

Although the arrays shown and described herein have utilized wire-like runs of Metals A and B, the invention is not limited to the structures of these examples. For instance, a planar substantially insulating substrate with a Metal A cladding on one side and a Metal B cladding on the other will provide dissimilar conductors adjacent each other at a plurality of locations. Switches may be disposed within the substrate at each location where a thermoelectric junction is to be formed. If the insulating substrate is semiconducting, the switches of the array may be formed integrally within the substrate.

Further, while in the preferred embodiment the switch closure actually forms the effective thermoelectric junction, the principles of the invention may be used to improve arrays such as in the prior art where there are permanent real contacting junctions between Metal A and Metal B branches. As described with regard to FIGS. 5 and 7, so long as the series of junctions between dissimilar material bounded by Metal A and Metal B is substantially isothermal, the presence of any number of such junctions will still result in a thermal voltage between Metal A and Metal B which is the voltage which would be produced by a Metal A-Metal B junction at that temperature. Thus, the switch of FIGS. 5 and 7 may be placed in a branch of a Metal A or Metal B conductor adjacent a permanently formed contact junction between Metal A and Metal B. So long as the switch and its junctions are substantially isothermal, the structure would form a useful addressable array. Referring to FIG. 4, each element includes a branch between the switch and the Metal A conductor 80, 82, or 84 and a branch between the switch and the Metal B conductor 86, 88, or 90. Switch S23 shows typical such branches 200 and 204. In FIG. 4, these are illustrated as intermediate in size between the thin Metal A conductors and the thick Metal B conductors, to show that they may be of a third conductor type. For instance, branches 200 and 204 may correspond to the electrode metal of the switch of FIGS. 5 and 7. If branches 200 and 204 were made of Metal B, a permanent Metal A-Metal B contact junction would be formed at location 202. Similarly, if branches 200 and 204 were made of Metal A, a permanent Metal A-Metal B contact junction would be formed at location 206. So long as the switch element between branches 200 and 204 is substantially isothermal, the element will product a thermal voltage and otherwise behave as a single contact junction between Metal A and Metal B at the temperature of junction 202 or 206.

Although the invention has been described using two dissimilar conductors as conductors which produce effective thermoelectric elements, the principles of the invention are applicable to arrays in which three or more conductor types are effective. For instance, the apparatus shown in FIG. 8 may be modified so that conductors 162 and 166 are made of a Metal "C" and are joined at another node separate from node 168. This would provide an array of alternating A-B and A-C thermoelectric elements. More than two conductor types can be used in an array dimension, and multiple conductor types can be used in each dimension of the array. Such arrays may be useful to measure temperature over extended ranges, so that the appropriate couple type may be used in different segments of the range. In such an arrangement, a single thermoelectric probe head may be made which is useful for a wide range of thermoelectric applications and which has only a single small set of conductors for coupling the probe head to an instrument. In such systems, provision must be made for the extra intermediate junctions formed and for reference junction measurements.

While particular embodiments of the invention have been shown and described, variations will no doubt occur to those skilled in the art without departing from the spirit and scope of the invention.

What is claimed is:

1. Thermoelectric apparatus comprising:
   a first conductor made of a first material;
   a second conductor, made of a second material, which differs from said first material, disposed adjacent to but not in contact with said first conductor; and
   a switch coupled to said first and second conductors and having a control input for receiving control signals, said switch having a conduction path including a third material which differs from said first and said second materials and selectively electrically coupling through said conduction path and decoupling said first and second conductors in accordance with control signals received at said control input.

2. Apparatus according to claim 1, wherein said control input is responsive to electrical control signals.

3. Apparatus according to claim 2, wherein said switch includes a field effect transistor.

4. Apparatus according to claim 1, wherein said switch and the portions of said first and second conductors adjacent thereto are substantially isothermal.

5. Apparatus according to claim 1, further including output means coupled to said conductors for producing an output which is responsive to the voltage between said conductors.

6. Apparatus according to claim 1, further including a third conductor made of said first material, wherein said third conductor contacts said second conductor to form a reference thermocouple junction.

7. Apparatus according to claim 6, further including means for maintaining said reference thermocouple junction at a predetermined reference temperature.

8. Thermoelectric apparatus comprising:
   a first conductor made of a first material and disposed adjacent each of a plurality of locations;
   a second conductor, made of a second material which differs from said first material, disposed adjacent each of the locations, not in contact with said first conductor; and
   a plurality of switches each having a conduction path including a material which differs from said first and second materials, one of said switches being disposed at each of the locations, each of said switches having at least one control input for receiving control signals, each of said switches selectively electrically coupling through its conduction path and decoupling said first conductor and said second conductor in response to received control signals.

9. Apparatus according to claim 8, wherein each of said switches includes two control inputs.

10. Apparatus according to claim 8, wherein said switches include field effective transistors.

11. Apparatus according to claim 10, wherein each of said switches includes a field effect transistor having two or more gates, each of said gates comprising a switch control input.

12. Apparatus according to claim 10, wherein each of said switches includes two field effect transistors, each of said transistors having a conduction channel and having a gate controlling conduction therein, said conduction channels being coupled in series, and the gate of each field effect transistor comprising a control input of said switch.

13. Apparatus according to claim 8, wherein said locations are disposed in an array.

14. Apparatus according to claim 13, wherein said array is a two dimensional array in which said first conductor is disposed in a plurality of rows and said second conductor is disposed in a plurality of columns.

15. Apparatus according to claim 14, wherein each of said switches has two control inputs, one control input of each switch is coupled to a row address line, and another control input of each switch is coupled to a column address line.

16. Apparatus according to claim 8, wherein said switches and said conductors are integrated together on a semiconductor substrate.

17. Apparatus according to claim 8, further including a third conductor made of said first material, wherein said third conductor contacts said second conductor to form a reference thermocouple.

18. Apparatus according to claim 17, further including means for maintaining said reference thermocouple junction at a predetermined reference temperature.

19. Apparatus according to claim 8, further including output means coupled to said first and second conductors for producing an output which is responsive to the voltage between said conductors and represents the temperature at a location where said conductors are electrically coupled.

20. A method of selectively forming a thermoelectric element at a location comprising the steps of:
   disposing a first conductor made of a first material and a second conductor made of a second material adjacent but not contacting each other at the location; and
   selectively electrically coupling and decoupling said conductors through a third conductor made of a third material comprising switching means at the location in response to control signals received by said switching means.

21. A method according to claim 20, wherein said disposing step includes disposing said first and second conductors adjacent each other at a plurality of locations, and said coupling step is performed at a selected one of the locations.

22. A method according to claim 21, wherein said disposing step includes disposing said conductors adjacent each other in locations which define an array.

23. A method according to claim 20, wherein said disposing step includes disposing said conductors and said switching means adjacent each other in a plurality of locations on a single substrate.

24. An array of switchable thermoelectric elements, each element comprising:
   a first conductor made of a first material;
   a second conductor made of a second material, said first and second conductors being disposed adjacent but not contacting each other at a location; and
   a switch disposed at said location, said switch selectively electrically coupling and decoupling said first conductor to said second conductor in response to a control signal received by said switch, wherein said switch and said first and second conductors at said location are substantially isothermal.

25. An array according to claim 24, wherein said switch includes a field effect transistor.

26. An array according to claim 24, wherein said switch includes a plurality of control inputs, and selectively couples said first and second conductors in accordance with control signals received at said control inputs.

27. An array according to claim 24, wherein said array is a two dimensional array in which said elements are arranged in rows and columns.

28. An array according to claim 24, wherein said conductors and said switches are integrated together on a semiconducting substrate.

* * * * *

UNITED STATES PATENT AND TRADEMARK OFFICE
CERTIFICATE OF CORRECTION

PATENT NO. : 5,261,747
DATED : November 16, 1993
INVENTOR(S) : Decautis et al.

It is certified that error appears in the above-indentified patent and that said Letters Patent is hereby corrected as shown below:

In Claim 10, column 10, line 30, delete "effective" and substitute therefor --effect--.

Signed and Sealed this

Twenty-fourth Day of May, 1994

Attest:

BRUCE LEHMAN

Attesting Officer      Commissioner of Patents and Trademarks